US005247737A

United States Patent [19]

Perry et al.

[11] Patent Number: 5,247,737

[45] Date of Patent: Sep. 28, 1993

[54] CAMSHAFT HOLDING AND INSTALLATION METHOD

[75] Inventors: Richard T. Perry, New Hartford; John R. Battye, Torrington, both of Conn.

[73] Assignee: The Torrington Company, Torrington, Conn.

[21] Appl. No.: 850,724

[22] Filed: Mar. 13, 1992

[51] Int. Cl.[5] .............. B23P 15/00

[52] U.S. Cl. .............. 29/888.01; 29/464

[58] Field of Search .............. 29/888.1, 888.01, 464; 74/567, 595; 123/90.6

[56] References Cited

U.S. PATENT DOCUMENTS 4,688,313 8/1987 Keller .............. 74/567

4,809,562 3/1989 Bendoraitas .............. 74/567

4,827,585 5/1989 Nakamura .............. 29/888.1

4,847,963 7/1989 Bendoraitas .............. 29/156.4 R 4,881,680 11/1989 Toelke et al. .............. 29/888.1

4,996,768 3/1991 Seyller .............. 29/888.1

5,085,099 2/1992 Hughes .............. 74/567

*Primary Examiner*—Irene Cuda

*Attorney, Agent, or Firm*—Michael H. Minns

[57] ABSTRACT

A method of holding a camshaft, one end of the camshaft having a bore, the bore having at least one orientation groove on its interior surface, including the steps of attaching an installation tool to an end of the camshaft, the installation tool having a plug end, the plug end having at least one rib about its outer surface, the ribs having a complementary shape to the orientation grooves, the plug end inserting into the camshaft bore, and using the installation tool to guide and orientate the camshaft.

8 Claims, 2 Drawing Sheets

CAMSHAFT HOLDING AND INSTALLATION METHOD

BACKGROUND OF THE INVENTION

This invention relates generally to a method of holding a camshaft during manufacturing and more particularly to a method of camshaft orientation during installation.

In order to ease the assembly of a camshaft into an engine, an orientation feature typically exists on the camshaft. The orientation feature provides a reference datum to assure proper orientation of the camshaft and cams with the engine timing features.

In one prior art camshaft, wrench flats were machined or cast onto an end of the camshaft. The wrench flats provided an orientation feature and a surface to clamp the camshaft during the tightening of a sprocket, spacer, and bolt being attached to the camshaft. These wrench flats require additional machining or forming and add parasitic weight to the camshaft.

In another camshaft, a "double D" shaped end plug was inserted into an end of the camshaft. The "double D" of the end plug provides the necessary orientation feature. The "double D" end plug also adds parasitic weight to the camshaft and requires an additional assembly step to insert the end plug and attach it to the camshaft.

The foregoing illustrates limitations known to exist in present methods of camshaft installation. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of holding a camshaft, one end of the camshaft having a bore, the bore having at least one orientation groove on its interior surface, comprising the steps of attaching an installation tool to an end of the camshaft, the installation tool having a plug end, the plug end having at least one rib about its outer surface, the ribs having a complementary shape to the orientation grooves, the plug end inserting into the camshaft bore, and using the installation tool to guide and orientate the camshaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
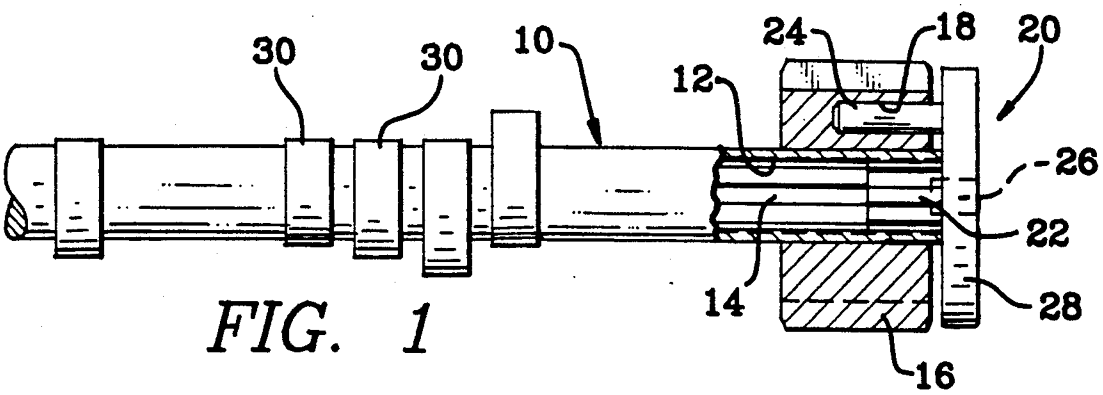
FIG. 1 is a side elevational, partially in cross-section, of a camshaft installation tool installed on an end of a camshaft.
Figure 2:
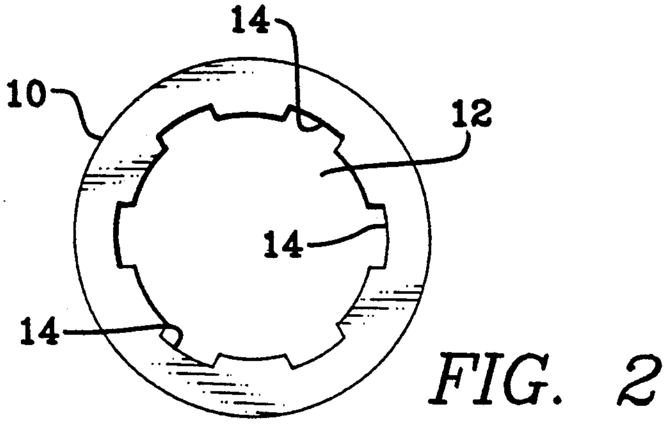
FIG. 2 is an end view of a camshaft showing the orientation grooves on the interior surface of the camshaft bore.

Shown in FIG. 1 is a typical camshaft 10 with a plurality of cam lobes 30 and a timing gear 16 located on one end of the camshaft 10. The timing gear 16 contains an orientation hole 18. The timing gear 16 is installed on the camshaft 10 with the orientation hole 18 indexed to the positioning of the cam lobes 30. The orientation hole 18 is used to provide a reference point when installing the camshaft. At least the end of the camshaft 10 with the timing gear 16 has a bore 12. The entire camshaft 10 may be formed from a tube thereby also forming bore 12. The interior surface of bore 12 has a plurality of orientation grooves 14 formed thereon. One method of manufacturing a tubular camshaft with a plurality of grooves on the inside surface of the tube is described in U.S. Pat. No. 4,858,295.

Figure 3:
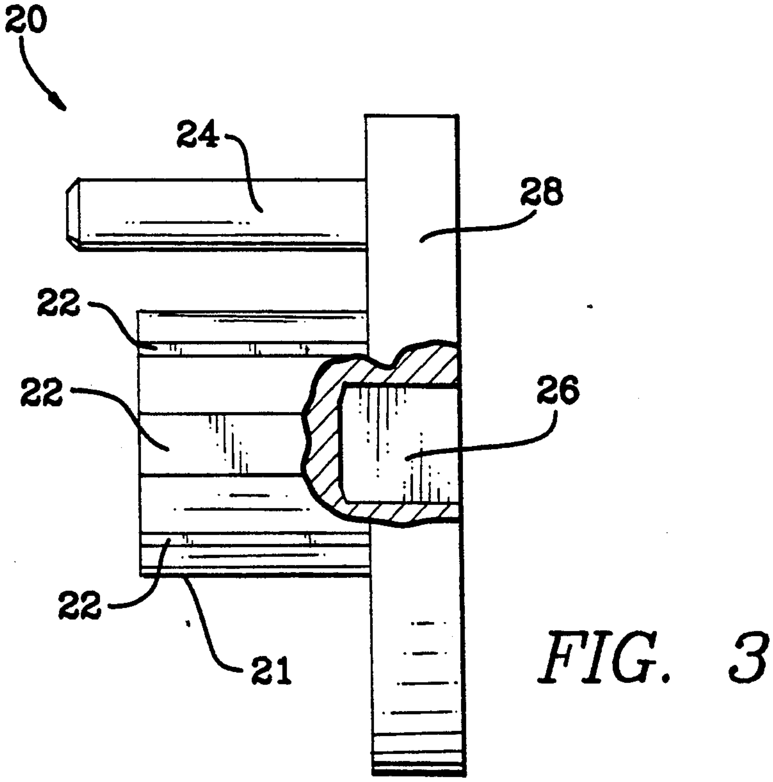
FIG. 3 is a side view of the camshaft installation tool.

A tool 20 for use in installing a camshaft 10 in an engine 50 is shown in FIGS. 1 and 3. The installation tool 20 is comprised of a support plate 28 with a socket 26 on the back face of support plate 28. The front face of the support plate 28 has a engaging member or plug 21 and an orientation finger 24 attached thereto. The engaging member 21 has a plurality of orientation ribs 22 about its outer surface. The engaging member 21 has a diameter slightly smaller than the inside diameter of bore 12. The placement, size and shape of the orientation ribs 22 is complementary to the placement, size and shape of the orientation grooves 14. When the installation tool 20 is used, the engaging member 21 is inserted into the bore 12, the orientation ribs 22 engaging the orientation grooves 14. In the preferred embodiment, the orientation finger 24 engages the orientation hole 18 in the timing gear 16. The installation tool 20 can be used without the orientation finger 24.

Although a plurality of orientation ribs and orientation grooves are described, the camshaft installation method only requires a single orientation rib and a single orientation groove. A plurality of orientation ribs and orientation grooves is preferred since this provides greater resistance to torque.

For the preferred embodiment with the orientation finger 24, to install a camshaft 10, the installation tool 20 is attached to a machine (not shown). The machine engages the socket 26. The installation tool 20 is attached to the machine with the orientation finger 24 in a known orientation to the machine. The machine inserts the installation tool 20 into the bore 12 of the camshaft 10. The installation tool 20 must be rotated until the orientation finger 24 lines up with the orientation hole 18 in the timing gear 16. Since the installation tool 20 is attached to the machine with the orientation finger 24 in a known orientation to the machine and the timing gear 16 is attached to the camshaft 10 in a known orientation to the cam lobes 30, the camshaft 10 and cam lobes 30 are now in a known orientation to the machine.

For some camshafts, the timing gear 16 is not attached to the camshaft 10 prior to installation of the camshaft 10 in the engine 50. For these camshafts, the orientation finger 24 engages a side surface of one of the cam lobes 30. Since the orientation finger 24 is attached in a known orientation to the machine and the cam lobes 30 are attached in a known orientation to the camshaft 10, the camshaft 10 and the cam lobes 30 are now in a known orientation to the machine.

The orientation ribs 22 on the engaging member 21 line up with the orientation grooves 14 in the camshaft bore 12. The orientation ribs 22 engage the orientation grooves 14 and provide resistance to torque during installation of the camshaft 10.

In one embodiment of the installation tool 20, the installation tool 20 held torque up to 35 foot-pounds. The tested installation tool 20 had a diameter of 0.81 inches, an orientation rib 22 width of 0.13 inches and an orientation rib 22 height of about 0.03 inches.

Figure 4:
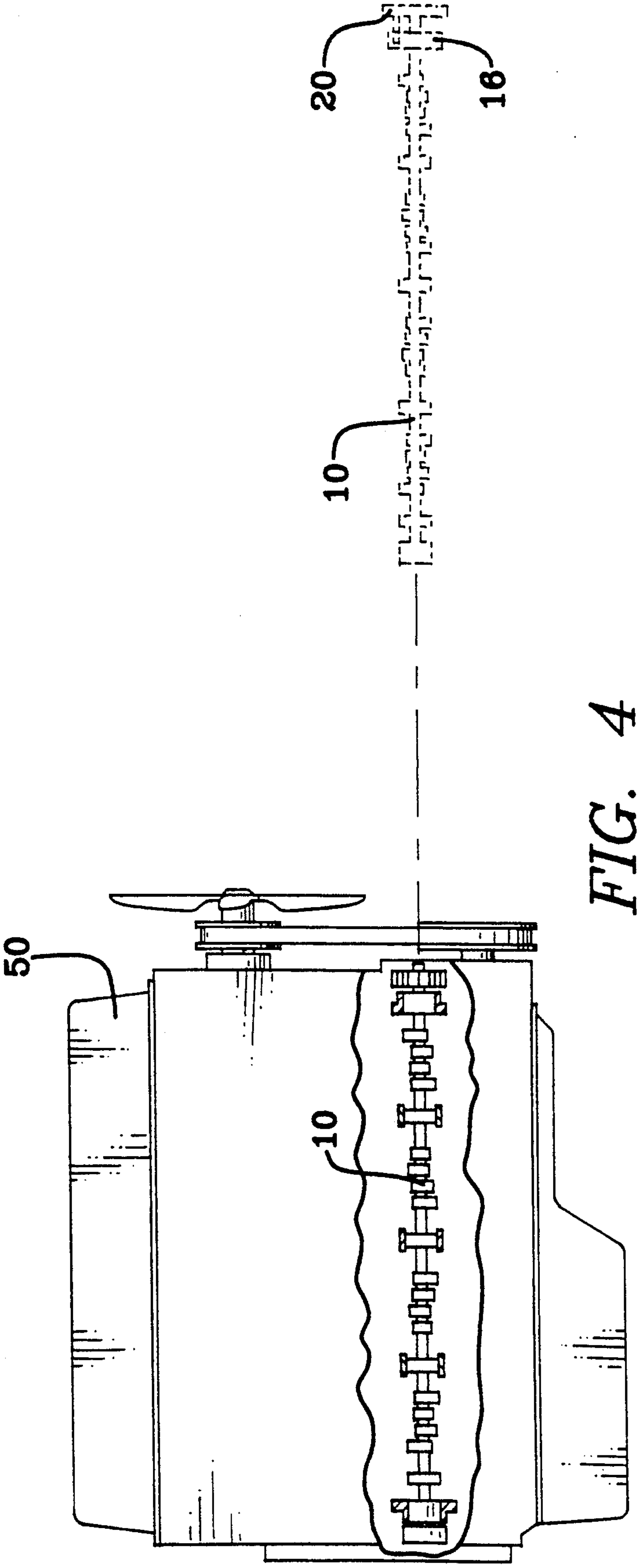
FIG. 4 is a schematic diagram of a camshaft being installed into an internal combustion engine using the camshaft installation tool shown in FIG. 1.

After the installation tool 20 engages the camshaft 10, the installation tool 20 and the camshaft 10 are rotated until the camshaft lobes 30 are properly orientated to the timing apparatus of the engine 50. The camshaft 10 is then inserted into the engine 50 as shown in FIG. 4. In some engines 50, other elements such as pulleys are attached to the camshaft 10. The orientation ribs 22 on the installation tool 20 resist the torque applied to the camshaft 10 while these elements are being attached to the camshaft, typically by tightening a bolt.

It is possible to use the installation tool 20 without the orientation finger 24. Without the orientation finger 24, some other mechanism must be used to orientate the camshaft 10 to the engine timing apparatus, since the machine used with the installation tool 20 will not be able to detect the orientation of the camshaft from the rotational position of the installation tool 20. For example, a machine operator can observe the position of the camshaft 20 and manual rotate the installation tool 20 and the camshaft 10 until the camshaft 10 and the cam lobes 30 are in the proper orientation with the engine timing apparatus. The installation can then proceed as described above.

In addition to being used for installation of a camshaft in an engine, this method can also be used to orientate and hold a camshaft during manufacturing. For example, the camshaft 10 could be held by the installation tool 20 while journal surfaces on the camshaft 10 are being machined.

Having described the invention, what is claimed is:

1. A method for holding a camshaft, comprising the steps of:

attaching an installation tool to an end of the camshaft, one end of the camshaft having a bore, the bore having at least one orientation groove on its interior surface, the installation tool having a plug end, the plug end having at least one rib about its outer surface, the at least one rib having a complementary shape to the at least one orientation groove, the plug end inserting into the grooved bore of the camshaft; and using the installation tool to guide and orientate the camshaft.

2. The method according to claim 1, further comprising the step of:

installing the camshaft in an engine.

3. The method according to claim 2, further comprising the step of:

rotating the camshaft and installation tool about a longitudinal axis whereby the camshaft is properly oriented relative to an engine timing apparatus prior to the engine timing apparatus being installed.

4. The method according to claim 1 wherein the installation tool grips the at least one orientation groove thereby providing resistance to any rotational torque applied to the camshaft.

5. The method according to claim 1 wherein the camshaft has a timing gear mounted thereon, the timing gear having an aperture and the installation tool having an orientation member, the installation tool being rotated about an axis until the orientation member aligns with the timing gear aperture.

6. The method according to claim 1, further comprising the step of:

performing additional manufacturing steps while holding the camshaft with the installation tool.

7. A method of installing a camshaft in an engine, the camshaft having a plurality of cam lobes thereon, comprising the steps of:

attaching an installation tool to an end of the camshaft, one end of the camshaft having a bore, the bore having at least one orientation groove on its interior surface, the installation tool having an engaging member, the engaging member having at least one rib about an outer surface, the at least one rib having a complementary shape to the at least one orientation groove, the plug end inserting into the grooved bore of the camshaft, the installation tool also having an orientation member thereon, the installation tool being rotated until the orientation member is aligned with a cam lobe;

rotating the camshaft and installation tool about a longitudinal axis whereby the cam lobes are properly oriented relative to an engine apparatus prior to the engine timing apparatus being installed;

using the installation tool to guide the camshaft while moving the camshaft into the engine; and removing the installation tool from the camshaft.

8. The method according to claim 7 wherein the camshaft has a timing gear mounted thereon, the timing gear having an aperture, the installation tool being rotated about an axis until the orientation member aligns with the timing gear aperture.

* * * * *